United States Patent
Henry et al.

(10) Patent No.: US 8,141,149 B1
(45) Date of Patent: Mar. 20, 2012

(54) KEYWORD OBFUSCATION

(75) Inventors: Brent E. Henry, Salt Lake City, UT (US); James E. Clingenpeel, Salt Lake City, UT (US)

(73) Assignee: Raytheon Oakley Systems, Inc., Salt Lake City, UT (US)

( * ) Notice: Subject to any disclaimer, the term of this patent is extended or adjusted under 35 U.S.C. 154(b) by 1409 days.

(21) Appl. No.: 11/557,007

(22) Filed: Nov. 6, 2006

Related U.S. Application Data

(60) Provisional application No. 60/734,909, filed on Nov. 8, 2005.

(51) Int. Cl.
*G06F 11/00* (2006.01)
(52) U.S. Cl. .......... 726/22; 370/394; 370/412; 713/182; 713/184; 726/23; 726/25
(58) Field of Classification Search .............. 726/22–23, 726/25; 713/182, 184; 707/6; 370/394; 4/22–23, 25
See application file for complete search history.

(56) References Cited

U.S. PATENT DOCUMENTS

| | | | |
|---|---|---|---|
| 6,023,582 A | 2/2000 | Rogers et al. | |
| 6,099,317 A | 8/2000 | Bullwinkel et al. | |
| 6,529,954 B1 | 3/2003 | Cookmeyer, II et al. | |
| 6,543,011 B1 | 4/2003 | Schumacher et al. | |
| 6,662,226 B1 | 12/2003 | Wang et al. | |
| 6,668,325 B1 * | 12/2003 | Collberg et al. | 713/194 |
| RE38,572 E | 8/2004 | Tetro et al. | |
| 6,772,107 B1 | 8/2004 | La Cascia, Jr. et al. | |
| 6,801,224 B1 | 10/2004 | Lewallen | |
| 6,832,367 B1 | 12/2004 | Choi et al. | |
| 6,976,218 B2 | 12/2005 | Stanford-Clark | |
| 6,996,068 B1 | 2/2006 | Sherlock | |
| 7,054,420 B2 | 5/2006 | Barker et al. | |
| 7,308,446 B1 * | 12/2007 | Panigrahy et al. | 1/1 |
| 7,418,733 B2 | 8/2008 | Connary et al. | |

(Continued)

FOREIGN PATENT DOCUMENTS

FR   EP 1 389 862   2/2004

OTHER PUBLICATIONS

Application entitled "*Replaying Events Collected from a Client Computer*"; U.S. Appl. No. 11/556,968; 50 pp., Nov. 6, 2006.

(Continued)

*Primary Examiner* — David Pearson
*Assistant Examiner* — Angela Holmes
(74) *Attorney, Agent, or Firm* — Schwegman, Lundberg & Woessner, P.A.

(57) ABSTRACT

Embodiments of the invention provide novel systems, methods and software for searching and/or analyzing text, based on a list of one or more keywords of interest. In a set of embodiments, a first computer generates a regular expression satisfied by a particular keyword of interest as well as a hash value corresponding to the keyword. In some embodiments, the regular expression and the hash value are transmitted to a second computer, which identifies a set of text associated with a particular event and/or evaluates the set of text against the regular expression. If the text satisfies the regular expression, the second computer might generate a text hash from the text. This text hash can be compared with the hash from the package, and if there is a match, the event might be identified as requiring monitoring, collection and/or further analysis.

35 Claims, 6 Drawing Sheets

U.S. PATENT DOCUMENTS

| | | | |
|---|---|---|---|
| 7,661,036 B1 | 2/2010 | Clingenpeel et al. | |
| 7,702,959 B2 | 4/2010 | Hwang et al. | |
| 7,730,011 B1 | 6/2010 | Deninger et al. | |
| 2001/0040942 A1 | 11/2001 | Glowny et al. | |
| 2001/0043685 A1 | 11/2001 | Bsheider et al. | |
| 2003/0009418 A1 | 1/2003 | Green et al. | |
| 2003/0033545 A1* | 2/2003 | Wenisch et al. | 713/202 |
| 2003/0053420 A1 | 3/2003 | Duckett et al. | |
| 2003/0074440 A1 | 4/2003 | Grabarnik et al. | |
| 2003/0101235 A1 | 5/2003 | Zhang | |
| 2003/0123447 A1* | 7/2003 | Smith | 370/394 |
| 2003/0214943 A1 | 11/2003 | Engstrom et al. | |
| 2003/0216988 A1 | 11/2003 | Mollett et al. | |
| 2004/0111479 A1 | 6/2004 | Borden et al. | |
| 2004/0153287 A1 | 8/2004 | Kirshenbaum et al. | |
| 2005/0060719 A1 | 3/2005 | Gray et al. | |
| 2005/0071760 A1 | 3/2005 | Jaeger | |
| 2005/0183143 A1* | 8/2005 | Anderholm et al. | 726/22 |
| 2005/0222844 A1 | 10/2005 | Kawahara et al. | |
| 2006/0074623 A1 | 4/2006 | Tankiwale | |
| 2006/0085691 A1 | 4/2006 | Rivera et al. | |
| 2006/0095569 A1 | 5/2006 | O'Sullivan | |
| 2006/0126817 A1 | 6/2006 | Beckett, II et al. | |
| 2006/0149674 A1 | 7/2006 | Cook et al. | |
| 2006/0190489 A1 | 8/2006 | Vohariwatt et al. | |
| 2006/0203807 A1 | 9/2006 | Kouretas et al. | |
| 2006/0271827 A1 | 11/2006 | Cascaval et al. | |
| 2006/0282270 A1 | 12/2006 | Sheets et al. | |
| 2007/0027785 A1 | 2/2007 | Lent et al. | |
| 2007/0028297 A1 | 2/2007 | Troyansky et al. | |
| 2007/0050844 A1 | 3/2007 | Lebel | |
| 2007/0143455 A1 | 6/2007 | Gorman et al. | |

OTHER PUBLICATIONS

Application entitled "*Validation of Social Security Numbers*"; U.S. Appl. No. 11/556,984; 43 pages, Nov. 6, 2006.

Application entitled "*Event Monitoring and Collections*"; U.S. Appl. No. 11/556,942, 47 pages, Nov. 6, 2006.

Application entitled *Monitoring and Collection of Audio Events*; U.S. Appl. No. 11/557,047; 38 pages, Nov. 6, 2006.

Van Blarcum, K. (2004), "Passive VoIP Call Recording" [White Paper], Retrieved from http://www.audiocodes.com/library; 13 pages, Dec. 6, 2004.

Baker, Foster, Sharp, "Cisco Architecture for Lawful Intercept in IP Networks", IETF Standard-Working-Draft, Oct. 2003, ISSN: 0000-0004, XP0150010527; (pp. 1-16).

Baker, "Cisco Lawful Intercept Control MIB draft-baker-slem-mib-00", IETF . . . Apr. 2003, ISSN: 0000-0004, XP015000178; (39 pages).

USPTO; Office Action, U.S. Appl. No. 11/556,942, filed Nov. 6, 2006; (25 pgs), Apr. 1, 2009.

*USPTO; Final Office Action*, U.S. Appl. No. 11/556,942, filed Nov. 6, 2006, (27 pgs), Nov. 9, 2009.

*USPTO; Office Action*, U.S. Appl. No. 11/556,942, filed Nov. 6, 2006, (32 pgs), Mar. 15, 2010.

*USPTO; Office Action*, U.S. Appl. No. 11/556,942, filed Nov. 6, 2006, (35 pgs), Aug. 17, 2010.

*USPTO; Office Action*, U.S. Appl. No. 11/556,942, filed Nov. 6, 2006, (34 pgs), Feb. 15, 2011.

*USPTO; Office Action*, U.S. Appl. No. 11/556,968, filed Nov. 6, 2006, (18 pgs), Jun. 24, 2010.

*USPTO; Office Action*, U.S. Appl. No. 11/556,968, filed Nov. 6, 2006 (12 pgs), Dec. 8, 2010.

*USPTO; Advisory Action*, U.S. Appl. No. 11/556,968, filed Nov. 6, 2006 (3 pgs), Feb. 25, 2011.

*USPTO; Office Action*, U.S. Appl. No. 11/557,025, filed Nov. 6, 2006, (7 pgs), Mar. 18, 2009.

*USPTO; Office Action*, U.S. Appl. No. 11/556,984, filed Nov. 6, 2006, (33 pgs), Aug. 4, 2010.

*USPTO; Office Action*, U.S. Appl. No. 11/556,984, filed Nov. 6, 2006 (32 pgs), Feb. 24, 2010.

*USPTO; Final Office Action*, U.S. Appl. No. 11/556,984, filed Nov. 6, 2006, (28 pgs), May 14, 2009.

*USPTO; Office Action*, U.S. Appl. No. 11/556,984, filed Nov. 6, 2006, (27 pgs), Sep. 4, 2008.

*USPTO; Final Office Action*, U.S. Appl. No. 11/556,984, filed Nov. 6, 2006, (40 pgs), Dec. 27, 2010.

*USPTO; Advisory Action*, U.S. Appl. No. 11/556,984, filed Nov. 6, 2006, (3 pgs), Mar. 16, 2011.

*USPTO; Office Action*, Appl. No. 11/557,047, filed Nov. 6, 2006, (21 pgs), Apr. 2, 2010.

*USPTO; Office Action*, U.S. Appl. No. 11/557,047, filed Nov. 6, 2006, (25 pgs), Nov. 1, 2010.

*USPTO; Office Action*, U.S. Appl. No. 11/556,942, filed Nov. 6, 2006, in the name of James E. Clingenpeel, May 12, 2011.

*USPTO; Examiner's Answer*, U.S. Appl. No. 11/556,968, filed Nov. 6, 2006, in the name of Brent E. Henry, Oct. 25, 2011.

*USPTO; Final Office Action*, U.S. Appl. No. 11/557,047, filed Nov. 6, 2006, in the name of Greg S. Neath, Apr. 5, 2011.

\* cited by examiner

KEYWORD OBFUSCATION

CROSS-REFERENCE TO RELATED APPLICATIONS

The present disclosure may be related to the following commonly assigned applications/patents:

This application claims priority from commonly-assigned provisional U.S. Patent Application No. 60/734,909, entitled "Keyword Obfuscation," and filed Nov. 8, 2005 by Henry et al.

This application is related to commonly-assigned U.S. patent application Ser. No. 11/556,942, entitled "Event Monitoring and Collection," and filed on a date even herewith by Clingenpeel et al., which claims priority from provisional U.S. Patent Application No. 60/734,886, entitled "Event Monitoring and Collection," and filed Nov. 8, 2005 by Clingenpeel et al.

This application is related to commonly-assigned U.S. patent application Ser. No. 11/556,968, entitled "Replaying Events Collected from a Client Computer," and filed on a date even herewith by Henry, which claims priority from provisional U.S. Patent Application No. 60/734,811, entitled "Replaying Events Collected from a Client Computer," and filed Nov. 8, 2005 by Henry.

This application is related to commonly-assigned U.S. patent application Ser. No. 11/557,025, entitled "Cache for Collecting Events on a Monitored Computer," and filed on a date even herewith by Clingenpeel et al., which claims priority from provisional U.S. Patent Application No. 60/734,887, entitled "Cache for Collecting Events on a Monitored Computer," and filed Nov. 8, 2005 by Clingenpeel et al.

This application is related to commonly-assigned U.S. patent application Ser. No. 11/556,984, entitled "Validation of Social Security Numbers," and filed on a date even herewith by Rogers, which claims priority from provisional U.S. Patent Application No. 60/734,812, entitled "Validation of Social Security Numbers," and filed Nov. 8, 2005 by Rogers.

This application is related to commonly-assigned U.S. patent application Ser. No. 11/557,047, entitled "Monitoring and Collection of Audio Events," and filed on a date even herewith by Neath et al., which claims priority from provisional U.S. Patent Application No. 60/734,911, entitled "Monitoring and Collection of Audio Events," and filed Nov. 8, 2005 by Neath et al.

The respective disclosures of these applications/patents are incorporated herein by reference in their entirety for all purposes.

FIELD OF THE INVENTION

The present invention relates to computer searching in general and in particular to methods and systems for searching text matching keywords.

BACKGROUND OF THE INVENTION

In most modern organizations, almost all important information is stored in electronic form, across a variety of computer networks, servers, and other information systems. Trusted users inside an organization often have access to confidential and protected information. Consequently, organizations often employ a variety of security mechanisms to prevent unauthorized access to and/or use of such information.

One such mechanism is through the monitoring of computing resources within the organization. Merely by way of example, U.S. patent application Ser. Nos. 11/556,942, 11/556,968, 11/557,025 and 11/557,047, already incorporated by reference, described several exemplary systems and methods for monitoring and/or replaying events occurring on a monitored computer. Other systems and methods are available as well.

Pattern matching algorithms, including keyword matching algorithms, are well-known in the field of computers. Such algorithms (which can include, without limitation regular expressions, hashes and similar tools) are often used to locate desired text from among a large block of undifferentiated text.

Accordingly, pattern and/or keyword matching routines can be useful in the field of computer monitoring, because such routines can assist in determining whether an event should be monitored and/or collected, based for example on a set of text associated with the event. Merely by way of example, if a user of a monitored computer sends an email message, that fact alone may be of little interest, because users commonly send email messages as part of their legitimate work activities. If that message, however, contains sensitive and/or confidential information, the sending of the message is of much more interest from a security standpoint.

Hence, it is useful to be able to perform keyword and/or pattern matching within the context of computer monitoring, as well as in a variety of other contexts. Most keyword or pattern matching applications, however, store the keywords/patterns of interest in a form that is relatively accessible. Merely by way of example, a keyword matching application might store a set of keywords of interest in a file, and compare monitored text with the keywords in that file in order to determine whether an event associated with the monitored text should be monitored, analyzed and/or collected.

In such an environment, a savvy user often will be able to ascertain the keywords of interest and take appropriate steps to disguise any illegitimate activity (e.g., by avoiding the use of the keywords). What is needed, therefore, are systems and methods that allow for pattern and/or keyword matching without providing any readily-identifiable indication of the keywords and/or patterns of interest.

BRIEF SUMMARY OF THE INVENTION

Embodiments of the invention provide novel systems, methods and software for searching and/or analyzing text, based on a list of one or more keywords of interest. In a set of embodiments, a first computer generates a regular expression satisfied by a particular keyword of interest as well as a hash value corresponding to the keyword. In some embodiments, the regular expression and the hash value are transmitted to a second computer, which identifies a set of text associated with a particular event and/or evaluates the set of text against the regular expression. If the text satisfies the regular expression, the second computer might generate a text hash from the text. This text hash can be compared with the hash from the package, and if there is a match, the event might be identified as requiring monitoring, collection and/or further analysis.

One set of embodiments provides systems for monitoring events on a monitored computer, including without limitation systems that execute software programs of the invention and/or implement methods of the invention. An exemplary system might comprise a first computer (which might be a monitoring computer, in some cases), as well as a software program executing on the monitored computer (the first computer might not be accessible by a user of the monitored computer). In some cases, the first computer can be used to configure the monitoring software on the monitored computer. Merely by way of example, the first computer might have a processor and a set of instructions executable by the processor.

In some embodiments, the set of instructions comprises instructions to receive a keyword (e.g, by receiving input from a user of the monitoring computer, parsing a file of keywords, etc) and/or instructions to generate a regulation expression that is satisfied by keyword. The set of instructions further includes, in some embodiments, instructions to generate at least one identifier corresponding to the keyword and/or to generate a set of one or more hash values corresponding to the keyword. A package comprising the hash value(s) and the identifier may be created, and the package and/or the regular expression may be transmitted for reception by the software program on the monitored computer.

The software program comprises, in some embodiments, a second set of instructions executable by the monitored computer. The second set of instructions might comprise instructions to receive the package and/or the regular expression from the first computer. The second set of instructions, in some cases, also comprises instructions to identify a set of text associated with an event and/or to evaluate the set of text against the regular expression. In this way, for example, the software program may determine whether at least a portion of the set of text satisfies the regular expressions. If so, a text hash may be generated from the portion of the set of text satisfying the regular expression, based on a determination that the portion of text does satisfy the regular expression. The software program then may comprise further instructions to compare the text hash to at least one of the hash values. Based on a comparison of the text hash with the at least one hash value, the event may be identified as requiring monitoring, further analysis and/or collection.

Another exemplary system can be used to facilitate the identification of an event on a monitored computer. The system might comprise a processor and a set of instructions executable by the processor. The set of instructions comprises, in some embodiments, instructions to receive a plurality of keywords. The plurality of keywords might comprise a first keyword and a second keyword. The set of instructions might further comprise instructions to generate a regular expression that is satisfied by both the first keyword and the second keyword. The set of instructions might further comprise instructions to generate a first set of one or more hash values corresponding to the first keyword and/or to generate a second set of one or more hash values corresponding to the second keyword. to transmit the regular expression and/or the first and second sets of one or more hash values for reception by the monitored computer. In this way, for example, the regular expression and the first and second sets of one or more hash values can be made available to be used to analyze text at the monitored computer, such that an event associated with text matching the regular expression and at least one hash value either of the sets of hash values can be identified as requiring monitoring.

Another set of embodiments comprises methods, including without limitation methods that can be implemented by systems and/or software of the invention. One exemplary method can be used to identify an event on a monitored computer as requiring monitoring (e.g., by identifying text associated with the event). The exemplary method might comprise receiving a keyword and/or generating a regular expression that is satisfied by the keyword. The method further comprises, in some embodiments, generating an identifier corresponding to the keyword and/or a set of one or more hash values corresponding to the keyword. The regular expression, identifier and set of one or more hash values might then be transmitted for reception by the monitored computer, so that, for example, the regular expression and the set of one or more hash values are available to be used to analyze text at the monitored computer, such that an event associated with text matching the regular expression and at least one of one or more hash values can be identified as requiring monitoring. In some cases, some or all of these procedures may be performed at a computer. In a particular case, the computer is not accessible by a user of the monitored computer.

An exemplary method of identifying an event requiring monitoring, in accordance with another set of embodiments, comprises a first computer receiving from a second computer a package corresponding to a keyword, In certain embodiments, the package comprises a regular expression that is satisfied by at least a portion of the keyword, an identifier corresponding to the keyword and at least one hash value generated from at least a portion of the keyword. The method further includes, in accordance with some embodiments, identifying a set of text (which may be associated with an event) at the first computer and/or evaluating the set of text against the regular expression to determine whether at least a portion of the set of text satisfies the regular expression, generating a text hash from the at least a portion of the set of text and/or comparing the text hash to the at least one hash value. Based, perhaps, on such a comparison, the event may be identified as an event requiring monitoring.

Yet another set of embodiments comprise computer programs, including without limitation computer programs implementing methods of the invention and/or executable on systems of the invention. An exemplary computer program for identifying an event requiring monitoring might be embodied on a computer readable medium. The exemplary computer program contains a set of instructions executable by one or more computers. In some embodiments, the set of instructions comprises receive a keyword and/or instructions to generate a regulation expression that is satisfied by keyword. The set of instructions further includes, in some embodiments, instructions to generate at least one identifier corresponding to the keyword and/or to generate a set of one or more hash values corresponding to the keyword. A package comprising the hash value(s) and the identifier may be created, and the package and/or the regular expression may be transmitted for reception by the software program on the monitored computer.

Another exemplary computer program comprises a set of instructions including instructions to receive (e.g., from another computer) a package corresponding to a keyword, the package comprising a regular expression that is satisfied by the keyword, an identifier corresponding to the keyword and at least one hash value generated from the keyword. The program might comprise further instructions to identify a set of text associated with an event, instructions to evaluate the set of text against the regular expression to determine whether at least a portion of the set of text satisfies the regular expression, and/or instructions to generate a text hash from the at least a portion of the set of text. Further, there may be instructions to compare the text hash to the at least one hash value and/or to identify the event as an event requiring monitoring, perhaps based on a comparison of the text hash with the at least one hash value.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
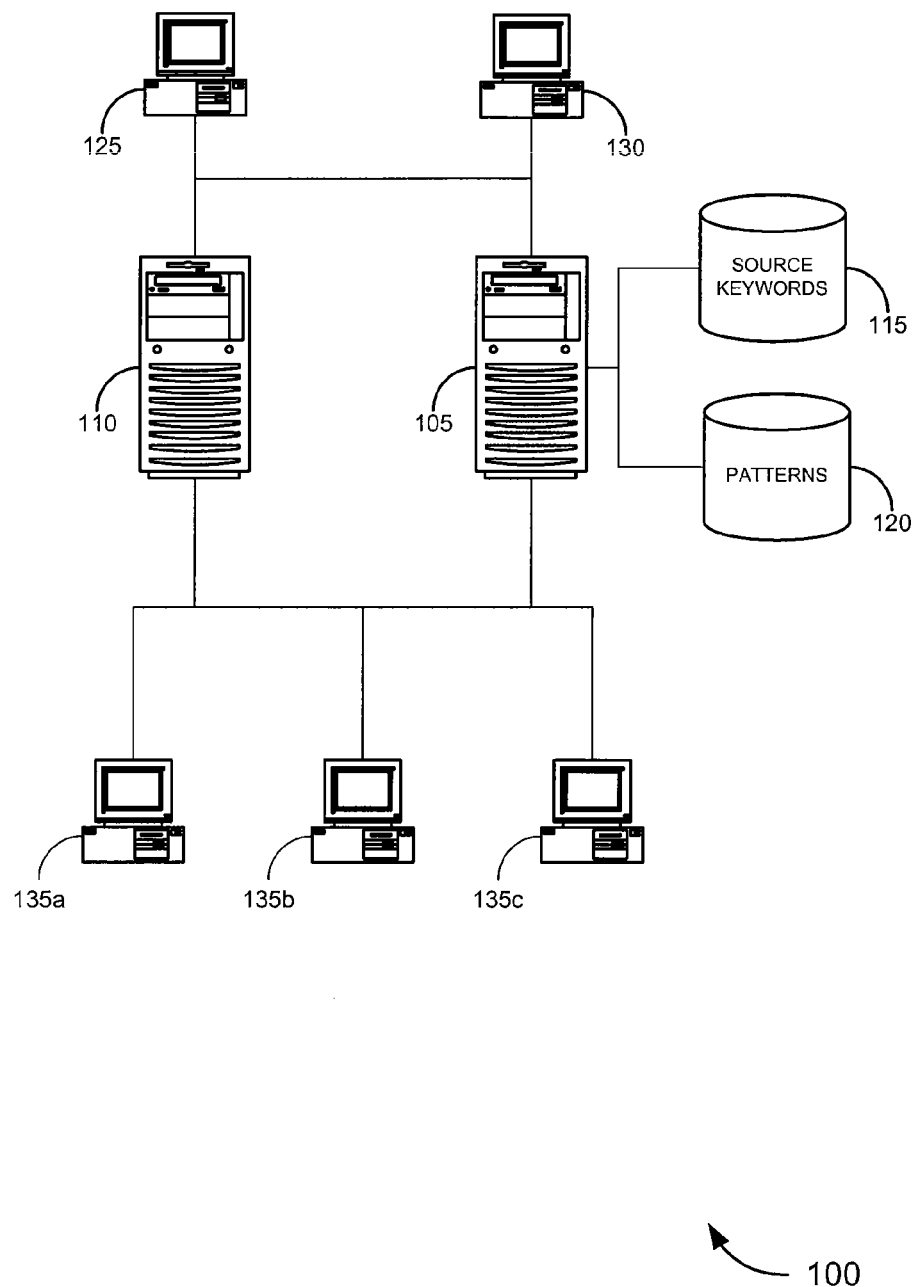
FIG. 1 is a generalized schematic diagram illustrating a system for monitoring and/or identifying events based on one or more keywords and/or patterns associated with the events, in accordance with various embodiments of the invention.

Embodiments of the invention provide novel systems, methods and software for searching and/or analyzing text, based on a list of one or more keywords of interest. In a set of embodiments, a first computer generates a regular expression satisfied by a particular keyword of interest as well as a hash value corresponding to the keyword. In some embodiments, the regular expression and the hash value are transmitted to a second computer, which identifies a set of text associated with a particular event and/or evaluates the set of text against the regular expression. If the text satisfies the regular expression, the second computer might generate a text hash from the text. This text hash can be compared with the hash from the package, and if there is a match, the event might be identified as requiring monitoring, collection and/or further analysis. Certain embodiments of the invention, provide methods, systems and/or software for effectively, efficiently, and deterministically performing the search for the keywords on the monitored target system while avoiding the need to reveal the actual content of the keyword list or transmit the actual contents of the keyword list to the monitored target system.

Merely by way of example, a system in accordance with embodiments of the invention functions in the following manner: The first phase of the operation is the analysis of the keyword list and creation of one or more obfuscated generic regular expression patterns, together with a table of entries for each keyword, as illustrated by Table 1.

TABLE 1

| Unique RefID | Short Hash | Long Hash | Master Regex | Modifier Regex |
| --- | --- | --- | --- | --- |
| 123456 | 32-bit value | 128-bit value | Master Regex 1 | Mod regex 1 |
| 234567 | 32-bit value | 128-bit value | Master Regex 1 | Mod regex 2 |
| 345678 | 32-bit value | 128-bit value | Master Regex 2 | Mod regex 3 |

Table 1 is used to store a unique reference identifier assigned to each keyword, along with a short hash, long hash, and one or more regular expressions generated for each of the keywords. In some cases, the short hash uses relatively few computing resources but can produce hash synonyms for different source values. An example of a short hash is the Fowler Noll Vo ("FNV") algorithm. The long hash may use relatively greater computer resources but produces no hash synonyms (at least for practical purposes) for the keyword. An example of a long hash is the MD5 algorithm. As described below, a master regular expression (which may be satisfied by more than one of the keywords) and a modifier regular expression (which is satisfied by one of the keywords, and in particular for a stemmed keyword) may be provided for each keyword. In some cases, the master expression may be generated so that it is satisfied by as many keywords as is reasonably possible, to minimize the number of master expressions that need to be provided. (In particular embodiments, the number of master expressions needed may be balanced against the length of the expressions and/or the level of obfuscation desired, when generating the master expressions.) The generation of the regular expression and hash values is described in further detail below. In some cases, the table may be sorted by short hash value, as the short hash value may be used as a search key when using the information in the table. These items are then transmitted from a control server to one or more monitored computers.

The second phase of the operation is the use of the transmitted regular expressions and table entries by a monitoring agent on the monitored target system to examine the text being monitored and, using the regular expression patterns and the combination of hash values for each keyword in the table, determine if there is an exact match for any keyword represented by the hash values hashes contained in the downloaded table.

The third phase of the operation occurs when text matching one (or more) long hashes is found in any of the monitored target systems. In that case, the monitored computer returns to the control server (and/or a separate monitoring server) the unique reference identifier corresponding the hash value(s) that matched. The control server (and/or monitoring computer) is then responsible for dereferencing the unique reference identifier and presenting back to an observer (which might be a human operator and/or a computer process) the keyword source that corresponds to the reference id returned by the monitored target system. Depending on this identification, a determination may be made of whether an event associated with the text should be monitored.

Thus the specific keyword entries are located in content being scanned on the monitored target system but without the need to deposit or retain any identifiable details of the content of the keyword list on the target system(s).

One set of embodiments, then, provides systems for monitoring events on a monitored computer, including without limitation systems that execute software programs of the invention and/or implement methods of the invention. FIG. 1 illustrates an exemplary system 100, which comprises a control server 105 as well as a monitoring server 110 (In some cases, the control server 105 and the monitoring server 110 may be incorporated within the same computer). Each of the servers 105, 110 may comprise an operating system, which can be virtually any appropriate operating system, including without limitation any of the various varieties of Microsoft Windows™, Apple Macintosh OS™, UNIX™ (and/or any derivative operating systems, such as BSD, Linux, etc.), and/or the like, as well as, in some cases, task-specific and/or embedded operating systems.

The control server 105 may comprise (and/or be in communication with) one or more data stores, including without limitation a data store 115 comprising source keywords (which can comprise, for example, a list of keywords of interest against which text should be analyzed in accordance with embodiments of the invention) and/or a data store 120 comprising generated patterns (including without limitation, regular expressions, identifiers and/or hash values generated in accordance with embodiments of the invention). The system 100 may also comprise a pattern creation computer 125 and/or a replay workstation 130 (examples of which are described in detail in U.S. patent application Ser. No. 11/556, 968, already incorporated by reference). The pattern creation computer 125 and/or the replay workstation might be, in some embodiments, a PC running any of a variety of operating systems, including without limitation those described above, and/or the pattern creation computer 125 and/or the replay workstation 130 may be incorporated in the same computer, which might be the control server 105 and/or the monitoring server 110. The pattern creation computer 125 can, for example, be responsible for identifying keywords of interest and/or generating regular expressions, identifiers and/or hash values in accordance with embodiments of the invention. (Alternatively and/or addition, these functions can be performed by the control server 105, perhaps under direction from the pattern creation computer 125.)

In some cases, the control computer 105 can be used to configure a monitoring software program (which might include a monitoring agent) on one or more monitored computers 135a. Merely by way of example, the control computer 105 might have a processor and a set of instructions executable by its processor.

In some embodiments, the set of instructions comprises instructions to receive a keyword (e.g, by receiving input from a user of the monitoring computer, parsing a file of keywords, etc) and/or instructions to generate a regulation expression that is satisfied by keyword. The set of instructions further includes, in some embodiments, instructions to generate at least one identifier corresponding to the keyword and/or to generate a set of one or more hash values corresponding to the keyword. A package comprising the hash value(s) and the identifier may be created, and the package and/or the regular expression may be transmitted for reception by the software program on the monitored computer 135.

The monitoring software program on the monitored computer 135 comprises, in some embodiments, a second set of instructions executable by the monitored computer 135. The second set of instructions might comprise instructions to receive the package and/or the regular expression from the control computer 105. The second set of instructions, in some cases, also comprises instructions to identify a set of text associated with an event and/or to evaluate the set of text against the regular expression. In this way, for example, the software program may determine whether at least a portion of the set of text satisfies the regular expressions. If so, a text hash may be generated from the portion of the set of text satisfying the regular expression, based on a determination that the portion of text does satisfy the regular expression. The software program then may comprise further instructions to compare the text hash to at least one of the hash values. Based on a comparison of the text hash with the at least one hash value, the event may be identified as requiring monitoring, further analysis and/or collection.

In some embodiments, the monitoring computer 110 may also be in communication with the monitored computer 135. The software program on the monitored computer 135 might comprise instructions to transmit for reception by the monitoring computer 110 a set of information associated with the event. As noted above, the monitoring computer 110 is the control computer 105 in some embodiments; in other embodiments, it might be a different computer.

In some cases, the keyword will comprise a stem, as well as at least one wildcard character. In such embodiments, generating a regular expression might include replacing the at least one wildcard character with a set of filler material to produce a modified keyword and/or generating a regular expression that is satisfied by the modified keyword.

Another exemplary computer system can be used to facilitate the identification of an event on a monitored computer 135. (It should be noted that, in some cases, the computer system is not accessible to a user of the monitored computer 135, such that processes on the computer system cannot be ascertained by the user of the monitored computer 135.) In some cases, the computer system might be the control server 105 described with respect to FIG. 1. The computer system might comprise a processor and a set of instructions executable by the processor. The set of instructions comprises, in some embodiments, instructions to receive a plurality of keywords. The plurality of keywords might comprise a first keyword and a second keyword. The set of instructions might further comprise instructions to generate a regular expression that is satisfied by both the first keyword and the second keyword.

The set of instructions might further comprise instructions to generate a first set of one or more hash values corresponding to the first keyword and/or to generate a second set of one or more hash values corresponding to the second keyword. to transmit the regular expression and/or the first and second sets of one or more hash values for reception by a monitored computer 135. In this way, for example, the regular expression and the first and second sets of one or more hash values can be made available to be used to analyze text at the monitored computer 135, such that an event associated with text matching the regular expression and at least one hash value either of the sets of hash values can be identified as requiring monitoring.

Figure 2:
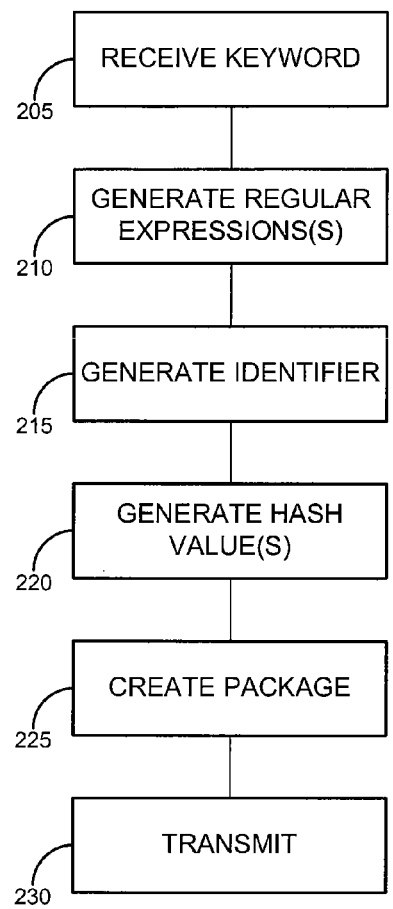
FIGS. 2 and 3 are process flow diagrams illustrating methods of monitoring and/or identifying events (and/or facilitating the monitoring and/or identification of such events), based on one or more keywords and/or patterns associated with the events, in accordance with various embodiments of the invention.

Another set of embodiments comprises methods, including without limitation methods that can be implemented by systems and/or software of the invention. One exemplary method 200 is depicted by FIG. 2. The method 200 can be used facilitate the identification of an event on a monitored computer as requiring monitoring (e.g., by identifying text associated with the event). The exemplary method 200 might comprise receiving a keyword (block 205). In a set of embodiments, this comprises a control server accepting the source definition of one or more keyword and/or stemmed keyword lists (e.g., from a pattern creation computer, keyword source file, etc.).

The method 200 might further include generating a regular expression that is satisfied by the keyword (block 210). As described in farther detail below, the regular expression might be configured so that it is not unique to the keyword and/or is not descriptive of the keyword. In this way, for example, the user of the monitored computer (and/or another) may be prevented from discovering the keyword by analyzing the regular expression. Additionally and/or alternatively, the regular expression might be satisfied by a plurality of selected keywords and/or at least one stemmed keyword (which might comprise, for example, a stem word and one or more wildcard characters).

Merely by way of example, Table 2 comprises an exemplar list of keywords and stemmed keywords may be used to generate a regular expression (in this example, the <*> wildcard symbol is used to represent 0 or more intervening characters, in the case of a stemmed keyword):

TABLE 2 jimbob88@yahoo.com
billybo@hotmail.com
billy*bobjoe
joey(joebob

In some embodiments, a frequency analysis is performed for all non-punctuation characters found in the list of keywords of interest, and/or an ordered list is created. Merely by way of example, a frequency analysis of non-punctuation characters for all words in the list in Table 2 yields: o=12; b=9; l=5; j=4; y=4; i=4; m=4; e=3; a=2; h=2; 8=2; c=2; t=1. An option may be provided to allow an operator to select a desired level of obfuscation for the generated regular expression (for example, None=0%; Low=50%; Medium=75%; High=100%). These values indicate the percentile of the character frequency list.

In some embodiments, based on the desired level of obfuscation, a regular expression obfuscation character class is created that consists of those characters up to and including the appropriate percentile drawn from the ordered character frequency, counting from highest frequency towards the lowest frequency. Generally, None is always set at 0%, meaning perform no obfuscation; the levels for Low, Medium and High can be any arbitrary values, so long as the values selected for Low is lower than that for Medium and the Medium value is lower than that for High. (Other schemes for obfuscation levels can provide arbitrary granularity with arbitrarily ordered names and associated sets of values.)

Using the exemplar above of Low, Medium and High results in the creation of the following corresponding regular expression obfuscation character classes for the keyword list in Table 2:

| Low | [obljyim] | 50th percentile of character frequencies |
|---|---|---|
| Medium | [obljyimeah] | 75th percentile of character frequencies |
| High | [obljyimeah8ct] | 100th percentile of character frequencies |

Once a particular obfuscation level has been selected and the appropriate regular expression obfuscation character class has been generated, this character class will be used for the construction of all master regular expressions and modifier regular expressions for the entire keyword list being processed.

Based on the selected obfuscation character class, a regular expression can be generated for each of the keywords of interest (in some cases, the generation of the appropriate regular expression can be an automated procedure, which might occur on the control server, for example). In a set of embodiments, the obfuscation character class to is used to replace as long a sequence as possible in each keyword. In generating the master regular expressions, each obfuscation character class generally must occur at least once, so it might be assigned the <+> replication symbol.

In some cases, an operator may be given the option to match only whole words (instead of word fragments matching a keyword). If so, then each regular expression may be bounded by a \b . . . \b pair of regular expression specifications.

In some embodiments, wildcard characters (such as <*> to name but one example). Merely by way of example, wherever an <*> wildcard symbol is encountered, it is replaced with the \w{0,7} or similar sequence that matches a generic sequence of unspecified word characters. It should be noted that this <*> replacement sequence can be set to any desired regular expression matching sequence that is suitable for the text being scanned; it should not be considered a fixed sequence. The selection of this <*> replacement sequence depends on the performance and generality required for the inter-pattern separator sequence.

Merely by way of example, using the list of Table 2, using an obfuscation level of None, the following set of master regular expressions would be generated:
/jimbob88@yahoo\.com/
/billybo@hotmail\.com/
/billy\w{0,7}bobjoe/
/joey\(joebob/

Clearly, this provides little obfuscation, since if this set of regular expressions were to be transmitted to a monitored client, it would be trivial for a user to discover they keywords the expressions are designed to identify. Hence, a higher obfuscation level might be desirable in some cases. By example, with a Medium obfuscation level, the following master regular expressions might be generated (one skilled in the art should recognize the nomenclature of regular expressions used herein):
/[obljyimeah]+88@[obljyimeah]+\.c[obljyimeah]+/
/[obljyimeah]+@[obljyimeah]+\.c[obljyimeah]+/
/[obljyimeah]+\w{0,7}[obljyimeah]+/
/[obljyimeah]+\([obljyimeah]+/

In contrast, at a High obfuscation level, the following master regular expressions might be generated:
/[obljyimeah8ct]+@[obljyimeah8ct]+\.[obljyimeah8ct]+/
/[obljyimeah8ct]+@[obljyimeah8ct]+\.[obljyimeah8ct]+/
/[obljyimeah8ct]+\w{0,7}[obljyimeah8ct]+/
/[obljyimeah8ct]+\([obljyimeah8ct]+/

One skilled in the art will appreciate, based on the disclosure herein, that this set of master regular expressions generated using the High obfuscation level contains redundancy and therefore can be reduced to the following set of master regular expressions:
/[obljyimeah8ct]+@[obljyimeah8ct]+\. [obljyimeah8ct]+/
/[obljyimeah8ct]+\w{0,7}[obljyimeah8ct]+/
/[obljyimeah8ct]+\([obljyimeah8ct]+/

In some embodiments, for each master regular expression, a corresponding modifier regular expression may be generated. Merely by way of example, the following transformation may be applied to a master regular expression to produce a corresponding modifier regular expression (others may be possible as well): (1) for each occurrence of the obfuscation character class, replace the <+> in the master regular expression with {n,n} where <n> is the actual length of the character string in the source keyword that is being replaced by the obfuscation character class; and (ii) for each regular expression sequence, other than the <*> replacement sequence, surround the sequence with regular expression capture parentheses. For a keyword with no <*> wildcard symbols, this may result in a single pair of capturing parentheses that surrounds the whole regular expression. In general, the number of pairs of capturing parentheses is equal to the count of <*> wildcard symbols plus one.

Optionally, after the modifier regular expressions are created, the master regular expressions may be further refined to limit the search scope by combining regular expressions with similar patterns and/or adding explicit length quantifiers. Merely by way of example, in some embodiments, all master regular expressions that are the same are reduced to a single master regular expression instance. Further, each <+> quantifier may be replaced by an {n,m} quantifier, where <n> is the minimum number or occurrences of the obfuscation character class symbols, and <m> is the maximum number of occurrences of the obfuscation character class symbols required to satisfy all of the keyword entries that were represented by the original individual master regular expressions that used the generic <+> quantifier. A refined regular set of regular expressions might include the following:

/[obljyimeah8ct]{7,8}@[obljyimeah8ct]{5,7}\.
   [obljyimeah8ct]{3,3}/
/[obljyimeah8ct]{5,5}\w{0,7}[obljyimeah8ct]{6,6}/
/[obljyimeah8ct]{4,4}\([obljyimeah8ct]{6,6}/

As desired, further recursive analysis and combination of the master regular expressions can be used to yield a minimal set of master regular expressions.

The method 200 further comprises, in some embodiments, generating an identifier corresponding to the keyword (block 215). In a set of embodiments, an identifier can be any string of characters that does not appear to have any relation to the keyword (such that interception of the identifier by a user of the monitored computer would not reveal the corresponding keyword), but which can be used to identify the keyword at the control server (perhaps through a correlation table, which might be maintained at a control server and/or another appropriate location, to assist in correlating text identified on the monitored client). An example of a correlation table is illustrated by Table 3).

TABLE 3

| Unique Ref Id | Keyword Value |
|---|---|
| 123456 | run |
| 234567 | walk* |
| 345678 | jump |

In certain embodiments, the method 200 further comprises generating a set of one or more hash values corresponding to the keyword (block 220). If the keyword source contains one or more wildcard symbols (e.g., <*>), as described above, the hash calculations might also include the wildcard symbol(s). In a set of embodiments, the set of one or more hash values comprises a first hash value and a second hash value. The first hash value might correspond to a plurality of words (including the keyword), while the second hash value might correspond only to the keyword. In particular embodiments, therefore, the first hash value might be a high-speed and/or low work-function hash value that processes text relatively quickly and/or cannot guarantee that the text matches the hash value exactly. By contrast, the second hash value might be a low-speed and/or high work-function hash value that might take relatively longer to process text and/or can guarantee that the text matches the hash value exactly. Possible hash algorithms that can be used include, but are not limited to a cyclic redundancy check ("CRC") value, a Fowler Null Vo ("FNV") hash value, an MD5 hash value, and a secure hash algorithm ("SHA") value, all of which are known to those skilled in the art. In a particular set of embodiments, for example, the first hash value might be calculated using the FNV algorithm and/or the second hash value might be calculated using the MD5 algorithm.

Figure 5:
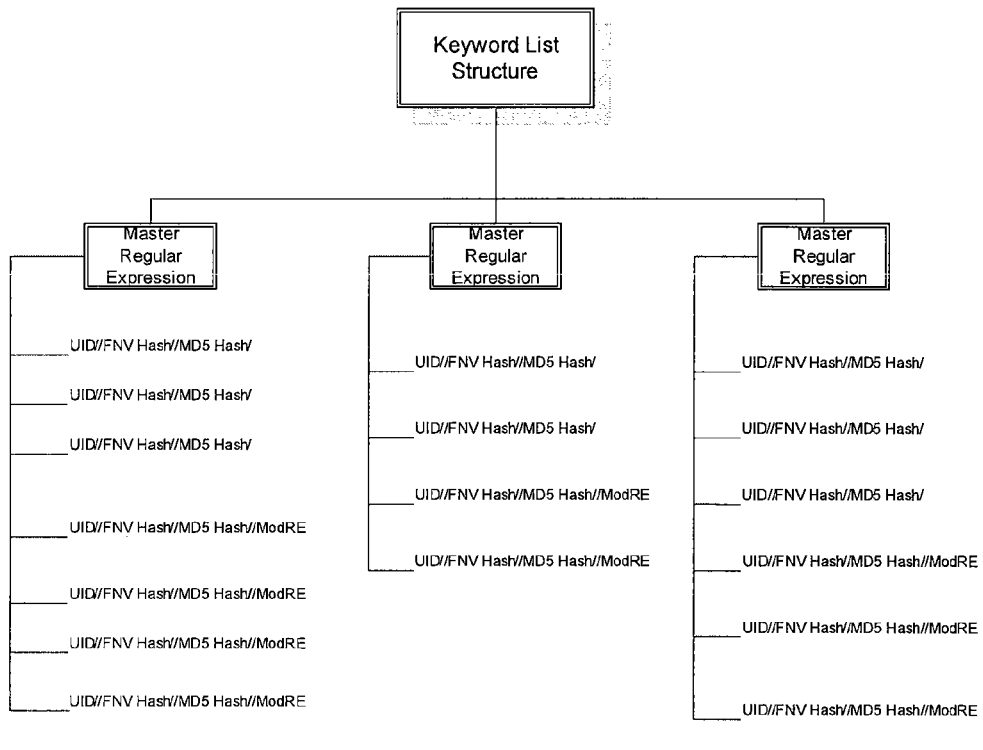
FIG. 5 is a generalized structural diagram illustrating a logical structure of a keyword list, in accordance with various embodiments of the invention.

Optionally, the method can include creating a package comprising the identifier(s) and/or the set of hash values for a set of one or more keywords (block 225). In some embodiments, the package may take the form of a table, an example of which is illustrated by FIG. 5. If the creator of the keyword list specified 'Match Whole Words Only' then the table structure, illustrated in FIG. 8, possibly will contain modifier regular expression entries only for those keywords for which there is an explicit wild card symbol <*> specified by the creator. Where the creator does not specify 'Match Whole Words Only' then the table also might contain Modifier Regular Expression entries corresponding to whole words, to detect those cases where a whole keyword is embedded inside a longer word.

The structure of the table illustrated in FIG. 5 is such that the master regular expression represents the most general case for matching the keyword list contents; each of the subordinate modifier regular expressions is a further specialized case that is contained within the scope of the master regular expression.

The regular expression, identifier and set of one or more hash values (which might be incorporated, with the identifier, in a package) might then be transmitted for reception by the monitored computer (block 230), so that, for example, the regular expression and the set of one or more hash values are available to be used to analyze text at the monitored computer, such that an event associated with text matching the regular expression and at least one of one or more hash values can be identified as requiring monitoring.

In a particular set of embodiments, the method further includes receiving from the monitored computer a set of information about the event. Merely by way of example, U.S. patent application Ser. Nos. 11/556,942, already incorporated by reference, described several ways of collecting information about events (as well as the types of information that might be collected about those events), and any of these procedures may be used in accordance with various embodiments of the invention.

In some cases, some or all of these procedures may be performed at a computer, including without limitation the control server 105 of FIG. 1, described in detail above. In a particular case, the computer is not accessible by a user of the monitored computer.

As noted above, the keyword may be a plurality of keywords, each of which might satisfy the regular expression. Accordingly, generating an identifier might comprise generating a plurality of identifiers, each corresponding to one of the plurality of keywords. Similarly, generating a set of one or more hash values comprises generating a plurality of sets one or more hash values, each of which corresponds to one of the plurality of keywords. In some cases, therefore, a plurality of packages might be created. Each of the packages might comprise an identifier and/or a set of hash values corresponding one of the plurality of keywords.

Figure 3:
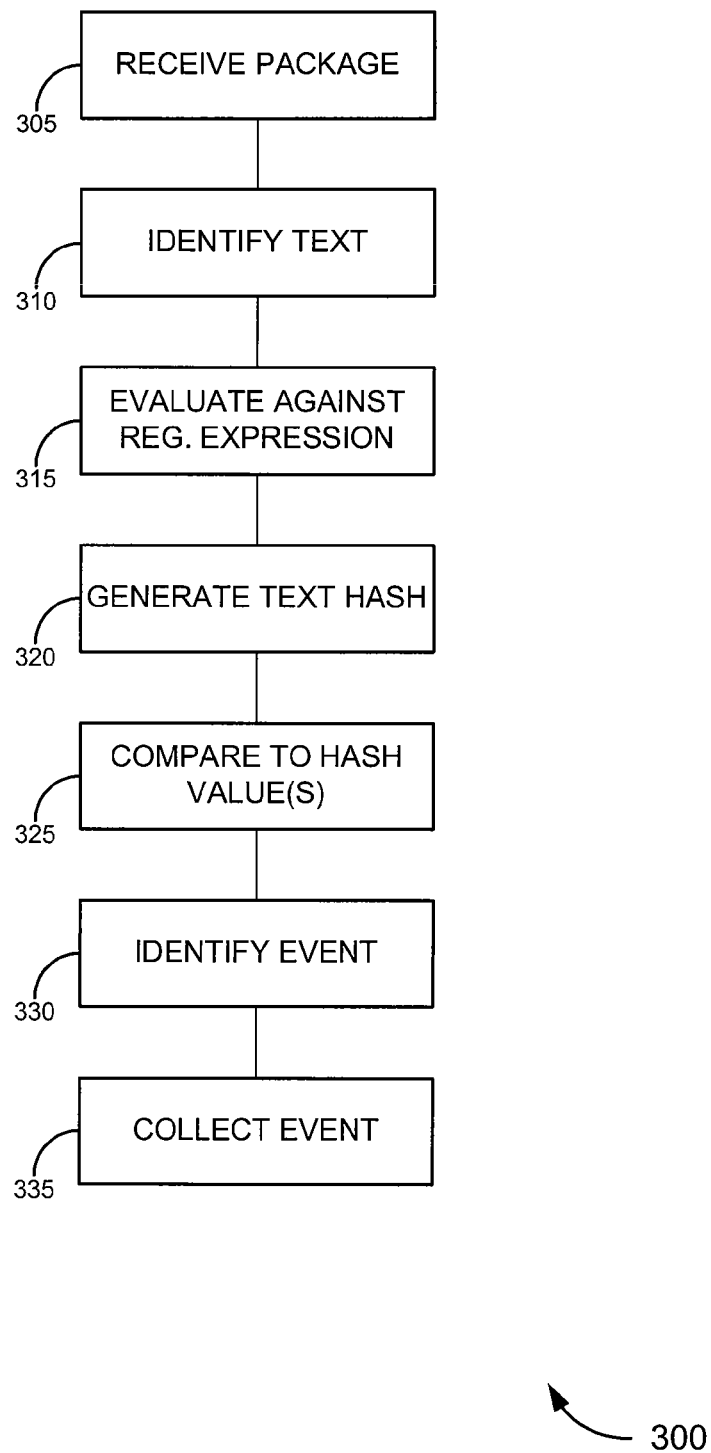

An exemplary method 300 of identifying an event requiring monitoring is illustrated by FIG. 3, in accordance with another set of embodiments. The method 300 comprises a first computer receiving from a second computer a package corresponding to a keyword (block 305). In certain embodiments, the package comprises a regular expression that is satisfied by at least a portion of the keyword, an identifier corresponding to the keyword and at least one hash value generated from at least a portion of the keyword. (The regular expression, identifier and hash value(s) might be generated using the process 200 described with respect to FIG. 2, above.) The method further includes, in accordance with some embodiments, identifying a set of text (which may be associated with an event) at the first computer (block 310). Identifying a set of text might comprise a monitoring agent monitoring operations on the computer that generate and/or transmit text. Merely by way of example, if a user composes, transmits and/or receives an electronic message and/or document, the composition and/or transmission may be monitored, and the text in the message/document might be identified for analysis. As another example, or if the user creates and/or accesses an office productivity application file or uses a clipboard cut and paste facility the contents of the action may be monitored and the text referenced by the action might be identified for analysis.

In some embodiments, the method further includes evaluating the set of text against the regular expression (block 315), for example to determine whether at least a portion of the set of text satisfies the regular expression, generating a text hash from the at least a portion of the set of text (block 320) and/or comparing the text hash to one or more hash values (block 325). A variety of procedures may be used to evaluate the text against the regular expression, generate the text hash and/or compare the text hash with the hash values, some of which are described in further detail with respect to FIG. 4, below.

Merely by way of example in some embodiments, comparing the text hash might comprise comparing the text hash with a first hash value (which might be generated using, inter alia, any of the algorithms described above, and in particular embodiments might be generated using a high-speed hash algorithm, such as FNV, as noted above) The first hash value might correspond to a plurality of words, including the keyword. Hence, if the text hash matches the first hash value, it might be compared with a second hash value (which again, might be generated using, inter alia, any of the algorithms described above, and in particular embodiments might be generated using a low-speed algorithm, such as MD5, also as noted above). This second hash value might correspond only to the keyword, such that if the text matches the second hash value, the text matches the keyword.

Based, perhaps, on a comparison of the text with one or more text hashes, the event may be identified as an event requiring monitoring (block 330). Optionally, information about the event (including, in some cases, a representation) might be collected (335). As noted above, the applications incorporated by reference describe various procedures for collecting events. In various embodiments, these and other procedures may be used.

In some cases, regular expressions generated by various embodiments of the invention might be satisfied by a stem of a keyword of interest. Merely by way of example, a stem of the keyword might comprise a portion of the keyword and/or at least one wildcard character. The regular expression, then, might be constructed using the portion of the keyword and a set of filler material (which is substituted for the wildcard character). The hash value(s) corresponding to the keyword, then, might be generated from the portion of the keyword and/or the wildcard character. Hence, the regular expression may be obfuscated (e.g., through the use of the filler material, which, in some embodiments, disguises the regular expression but does not affect the universe of words that satisfy the regular expression, as compared to a regular expression generated from the (possibly stemmed) keyword).

In a set of embodiments, a monitored computer may uses an installed agent to execute a process, subject to a package of regular expressions, digital signature hashes and/or unique reference identifiers (for example as described above with respect to FIG. 2), for the purpose of analyzing content on the monitored target system to determine if there are one or more matches with entries in a keyword list. This process was described generally above with respect to FIG. 3.

Figure 4:
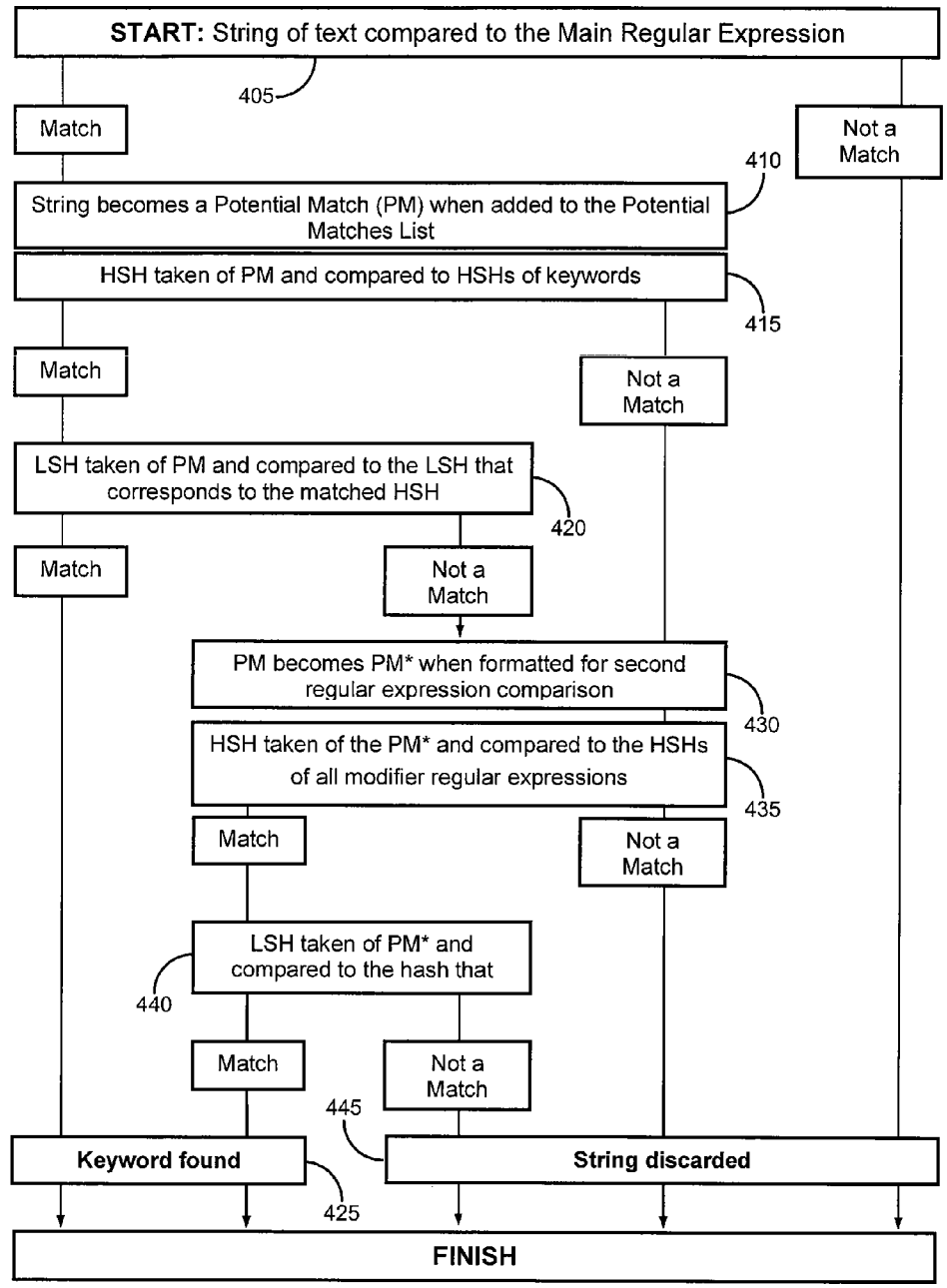
FIG. 4 is a process flow diagram illustrating a method of analyzing a set of text, in accordance with various embodiments of the invention.

FIG. 4 provides a detailed illustration of an example of one such method 400 for evaluating a set of text, in accordance with a set of embodiments. Various procedures in the method 400 can be used to evaluate a set of text against a regular expression and/or to compare one or more hashes generated from the set of text. (In a set of embodiments, the method 400 may be performed iteratively for each of a plurality of master regular expressions, if the monitoring agent has been configured with multiple master regular expressions.) In some embodiments, the text to be analyzed is processed sequentially, beginning at the first character of the text to be scanned and proceeding character by character to the end of the text, using the regular expressions created for matching keyword list entries. For a given set of text, the monitoring agent first evaluates the text against one or more master regular expressions (block 405). Procedures for evaluating text with a regular expression are known in the art and need not be explained in detail here. If a string of text matches one or more regular expressions, this string is deemed to be a potential match (referred to as "PM" on FIG. 4) (block 410), and a short text hash (referred to on FIG. 4 as a "high speed hash" or "HSH" on FIG. 4) is generated from the PM string and compared with one or more short hash values generated from one or more keywords satisfying the regular expression (e.g., the short hash values in the matching keyword table) (block 415). The short text hash can be generated using any low work-function hash algorithm, (such as FNV, to name but one example), but one skilled in the art will recognize, based on the disclosure herein, that generally generate the short text hash of the PM string will be generated by the same algorithm that was used to generate the short hash values in the table.

If one or more of the short hash values for the keyword(s) match the short text hash of the PM string, a long text hash (referred to on FIG. 4 as a "low speed hash" or "LSH") is computed for the PM text string and compared to the long hash for each of the table entries where the PM short hash was found to match (block 420. (Once again. the long text hash can be generated using any high work-function hash algorithm—such as MD5, to name but one example—but one skilled in the art will recognize, based on the disclosure herein, that generally generate the long text hash of the PM string will be generated by the same algorithm that was used to generate the long hash values in the table.)

In many embodiments, because the short hash algorithm may produce synonyms for different PM text strings, there exists the possibility that there may be more than one PM short hash match; however, in accordance with selected embodiments, the long hash algorithm does not produce synonyms and therefore the process attempts to match the PM text string with the long hash value corresponding to each of the short hash values that matched the PM string.

If a match is found for the long text hash of the PM text string then the text string matches the keyword corresponding to the matching long hash value, and the agent notes that this keyword has been found in the text (block 425).

At the conclusion of a successful match event for a keyword entry, the agent will advance to the next character position in the set of text being monitored and repeat the same algorithm, until the end of the set of text being analyzed has been reached.

In the set of embodiments illustrated by FIG. 4, there are two possible cases in which no matching hash value is found for a given PM text string. First, there might be no short hash value in the table matching the generated short text hash for the PM string. Second, there may be one or more matching short hash matches values found in the table, but the long text hash of the PM string might not match any long hash values in the table.

In either case, the agent proceeds to use, in some cases one at a time, any modifier regular expressions that were created to correspond to keywords with embedded wildcard symbols.

In an analogous manner to that described above, a modifier regular expression can be used to locate stemmed keywords that include a wildcard symbol (such as an asterisk, <*>). Each modifier regular expression may be constructed (as described above with respect to FIG. 2) to search for the keyword stem and some number of undefined characters that will satisfy the wildcard symbol. In the cases of stemmed keywords, the short and long hashes are computed using the stemmed keyword value, complete with the original wildcard symbol as part of the source value for which the hash is computed. The modifier regular expressions can also be used to locate whole keywords that might be contained within a larger word, assuming the creator of the keyword list did not specify 'Match Whole Words Only' option when the keyword list was created.

Whenever a potential wildcard stemmed keyword match is found by application of the Modifier Regular Expression, the potential match PM stemmed keyword candidate is reduced back to the PM<*> (or <*>PM or PM<*>PM) format, and/or the short and/or long text hashes for the text string are computed using PM<*> as the source input to the hash algorithms.

Hence, if no matching hash value is found for the PM text string isolated using the master regular expression is now formatted as PM* (block 430) and may be re-used for pattern detection using one or more modifier regular expressions associated with the master regular expression satisfied by the PM text string. As noted above, in a set of embodiments, each of the modifier regular expressions might comprise a more specialized, more restricted case of the general master regular expression, so the search is made, in some cases, using the PM text string that was isolated using the master regular expression.

For each modifier regular expression associated (e.g., in a table exemplified by FIG. 5) with the current master regular expression, the PM* text string is evaluated to determine if there is a pattern match. As noted above, in some embodiments, the modifier regular expressions are created with two pairs of capturing parentheses. Any characters not captured by the capturing parentheses therefore generally represent wildcard symbols.

All of these characters are replaced by a single wildcard character (e.g., an asterisk <*>) in the PM* text string, and the short hash value is taken of the PM* text string (accounting for the presence of the wildcard character) and compared with the short hash values generated from stemmed keywords (e.g., keywords having one or more wildcard characters) and associated with the current modifier regular expression (block 435).

If the short text hash of the PM* text string does not match any of the short hash values for the current modifier regular expression, then the process is repeated for the next modifier regular expression, and so on, until all of the modifier regular expressions have been exhausted, or a match is found.

If the short text hash of the PM* text string does indeed match the short hash value corresponding to one of the modifier regular expressions, then a long text hash is generated for the PM* text string and compared to the corresponding long hash value(s) associated with that modifier regular expression (block 440). If there is a match, then a stemmed keyword (and/or a whole keyword embedded within a longer word) has been found (block 425).

If the short text hash of the PM* text string was a match but the long text hash of the PM* text string was not a match, the next modifier regular expression is tried, and so on, until all of the modifier regular expressions have been exhausted, or a subsequent match is found.

If a text string does not satisfy any of the master regular expressions, and/or a hash of a PM* text string does not match any long hash values associated with any of the modifier regular expressions, the text string is considered not to comprise any keywords of interest, and the string is discarded (block 445).

In a set of embodiments, the monitoring agent steps through the set of text to be analyzed character by character. At each character position the agent might apply some or all of the method 400, analyzing the text using first each master regular expression and then, if no match is found, each of the modifier regular expressions under each of the master regular expressions, until all of the potentially matching hash values have been exhausted, or a match is found, whichever occurs earlier. If 'Match Whole Words Only' was specified by the creator of the keyword list, then the iteration through the text being analyzed can be advanced to the next word boundary rather than the next character, improving the performance of the scanning process.

In a set of embodiments, then, the unique reference identifier corresponding to each of found keywords might be added to the a list of identifiers for found keywords, which might be reported to a control server and/or a monitoring server. Alternatively and/or in addition, if a text string is found to match a keyword, an event associated with the text string might be designated for monitoring, further analysis and/or collection.

Yet another set of embodiments comprise computer programs, including without limitation computer programs implementing methods of the invention and/or executable on systems of the invention. An exemplary computer program for identifying an event requiring monitoring might be embodied on a computer readable medium. The exemplary computer program contains a set of instructions executable by one or more computers. In some embodiments, the set of instructions comprises receive a keyword and/or instructions to generate a regulation expression that is satisfied by keyword. The set of instructions further includes, in some embodiments, instructions to generate at least one identifier corresponding to the keyword and/or to generate a set of one or more hash values corresponding to the keyword. A package comprising the hash value(s) and the identifier may be created, and the package and/or the regular expression may be transmitted for reception by the software program on the monitored computer.

Another exemplary computer program comprises a set of instructions including instructions to receive (e.g., from another computer) a package corresponding to a keyword, the package comprising a regular expression that is satisfied by the keyword, an identifier corresponding to the keyword and at least one hash value generated from the keyword. The program might comprise further instructions to identify a set of text associated with an event, instructions to evaluate the set of text against the regular expression to determine whether at least a portion of the set of text satisfies the regular expression, and/or instructions to generate a text hash from the at least a portion of the set of text. Further, there may be instructions to compare the text hash to the at least one hash value and/or to identify the event as an event requiring monitoring, perhaps based on a comparison of the text hash with the at least one hash value.

In a set of embodiments, the computer program may be designed to be uploaded to a monitored computer without the knowledge of the user of the first computer and/or to execute the set of instructions without the knowledge of the user (for example, by running as a background process and/or in a thread of execution common to a monitored application). Alternatively, the computer program might be designed to execute the set of instructions without providing to the user any information about the set of text being monitored (for example, through the obfuscation techniques described elsewhere herein).

Hence, in an embodiment of the invention, a method might comprise uploading the computer program to a computer without the knowledge of a user of that computer and/or executing the program in such a way that the user is unaware of the existence of the program (and/or at least without providing to the user any information about the set of text being monitored).

Figure 6:
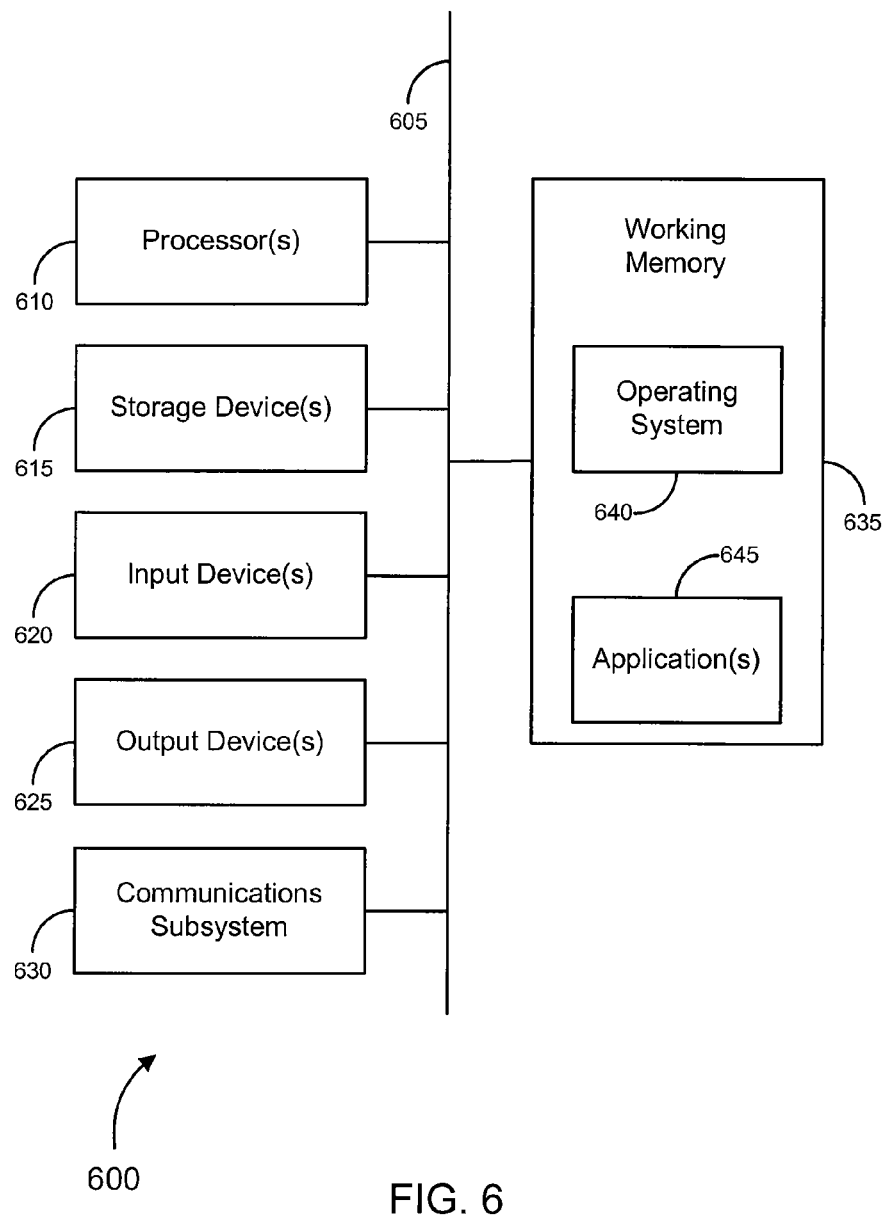
FIG. 6 provides a generalized schematic illustration of a computer system suitable for performing various embodiments described herein.

FIG. 6 provides a generalized schematic illustration of one embodiment of a computer system 600 that can perform the methods of the invention and/or the functions of computer, such as the computers 105, 110, 125, 130, 135 described above. FIG. 6 is meant only to provide a generalized illustration of various components, any of which may be utilized as appropriate. The computer system 600 can include hardware components that can be coupled electrically via a bus 605, including one or more processors 610; one or more storage devices 615, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 605 can be one or more input devices 620, which can include without limitation a mouse, a keyboard and/or the like; one or more output devices 625, which can include without limitation a display device, a printer and/or the like; and a communications subsystem 630; which can include without limitation a modem, a network card (wireless or wired), an infra-red communication device, and/or the like.

The computer system 600 also can comprise software elements, shown as being currently located within a working memory 635, including an operating system 640 and/or other code 645, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for monitoring events on a monitored computer, the system comprising:
 a first computer not accessible by a user of the monitored computer, the first computer comprising a processor and a first set of instructions executable by the processor, the first set of instructions comprising:
  a) instructions to receive a keyword;
  b) instructions to generate a regular expression that is satisfied by the keyword;
  c) instructions to generate at least one identifier corresponding to the keyword;
  d) instructions to generate a set of one or more one hash values corresponding to the keyword;
  e) instructions to create at least one package comprising the identifier and the one or more hash values; and
  f) instructions to transmit the regular expression and the package for reception by a software program executing on the monitored computer; and
 a software program executing on the monitored computer, the software program comprising a second set of instructions executable by the monitored computer, the second set of instructions comprising:
  aa) instructions to receive the regular expression and the package from the first computer;
  bb) instructions to identify a set of text at the monitored computer, the set of text being associated with an event;
  cc) instructions to evaluate the set of text against the regular expression to determine whether at least a portion of the set of text satisfies the regular expression;
  dd) instructions to generate a text hash from the at least a portion of the set of text, based on a determination that the at least a portion of the set of text satisfies the regular expression;
  ee) instructions to compare the text hash to at least one of the one or more hash values;
  ff) instructions to identify the event as an event requiring monitoring, based on a comparison of the text hash with the at least one hash value.

2. A system as recited by 1, wherein the system further comprises a monitoring computer in communication with the monitored computer, and wherein the second set of instructions further comprises:
 instructions to transmit for reception by the monitoring computer a set of information associated with the event.

3. The system recited in claim 2, wherein the first computer is the monitoring computer.

4. The system recited in claim 1, wherein the set of one or more hash values comprises a first hash value and a second hash value.

5. The system recited in claim 4, wherein the first hash value corresponds to a plurality of words including the keyword, and wherein the second hash value corresponds only to the keyword.

6. The system recited in claim 1, wherein each of the one or more hash values is selected from the group consisting of a cyclic redundancy check ("CRC") value, a Fowler Null Vo ("FNV") hash value, an MD5 hash value, and a secure hash algorithm ("SHA") value.

7. The system recited in claim 1, wherein the keyword comprises a stem and at least one wildcard character.

8. The system recited in claim 7, wherein generating a regular expression that is satisfied by the keyword comprises:
replacing the at least one wildcard character with a set of filler material to produce a modified keyword; and
generating a regular expression that is satisfied by the modified keyword.

9. A method of identifying an event on a monitored computer as requiring monitoring, by identifying text associated with the event, the method comprising:
receiving, at a computer not accessible by a user of the monitored computer, a keyword;
generating, at the computer not accessible by the user of the monitored computer, a regular expression that is satisfied by the keyword;
generating, at the computer not accessible by the user of the monitored computer, an identifier corresponding to the keyword;
generating, at the computer not accessible by the user of the monitored computer, a set of one or more hash values corresponding to the keyword;
transmitting the regular expression, the identifier and the set of one or more hash values for reception by the monitored computer so the regular expression and the set of one or more hash values are available to be used to analyze text at the monitored computer, such that an event associated with text matching the regular expression and at least one of one or more hash values can be identified as requiring monitoring.

10. The method recited in claim 9, further comprising creating a package comprising the identifier and the set of one or more hash values, wherein transmitting the identifier and the set of one or more hash values comprises transmitting the package.

11. The method recited in claim 9, wherein the regular expression is not unique to the keyword and is not descriptive of the keyword.

12. The method recited in claim 9, wherein the regular expression is satisfied by a plurality of selected keywords.

13. The method recited in claim 9, wherein the regular expression is satisfied by at least one stemmed keyword.

14. The method recited in claim 9, wherein the keyword is a plurality of keywords, and wherein the regular expression is satisfied by each of the plurality of keywords.

15. The method recited in claim 14, wherein:
generating an identifier comprises generating a plurality of identifiers, each of the plurality of identifiers corresponding to one of the plurality of keywords; and
generating a set of one or more hash values comprises generating a plurality of sets of one
or more hash values, each of the plurality of sets of one or more hash values corresponding to one of the plurality of keywords.

16. The method recited in claim 15, further comprising:
creating a plurality of packages, each of the plurality of packages comprising an identifier corresponding to one of the plurality of keywords and a set of hash values corresponding to the one of the plurality of keywords;
wherein transmitting the regular expression, the identifier and the set of one or more hash values comprises transmitting the plurality of packages.

17. The method recited in claim 9, wherein the at least one hash value comprises one or more hash values, each of the one or more hash values being selected from the group consisting of: a cyclic redundancy check ("CRC") value, a Fowler Null Vo ("FNV") hash value, an MD5 hash value, and a secure hash algorithm ("SHA") value.

18. The method recited in claim 9, wherein the set of at least one hash value comprises a first hash value and a second hash value.

19. The method recited in claim 18, wherein the first hash value is calculated using the Fowler Null Vo algorithm.

20. The method recited in claim 18, wherein the second hash value is calculated using the MD5 algorithm.

21. The method recited in claim 18, wherein the first hash value may correspond to a plurality of words including the keyword, and wherein the second hash value corresponds only to the keyword.

22. The method recited in claim 18, wherein the first hash value is a high speed, low work-function hash value, and wherein the second hash value is a low-speed, high-work function hash value.

23. The method recited in claim 9, further comprising:
receiving from the monitored computer a set of information about the event.

24. A computer system for facilitating the identification of an event on a monitored computer, wherein the computer system is not accessible by a user of the monitored computer, the computer system comprising a processor and a set of instructions executable by the processor, the set of instructions comprising:
instructions to receive a plurality of keyword comprising a first keyword and a second keyword;
instructions to generate a regular expression that is satisfied by both the first keyword and the second keyword;
instructions to generate a first set of one or more hash values corresponding to the first keyword;
instructions to generate a second set of one or more hash values corresponding to the second keyword; and
instructions to transmit the regular expression, the first set of one or more hash values, and the second set of one or more hash values for reception by the monitored computer so the regular expression and the first and second sets of one or more hash values are available to be used to analyze text at the monitored computer, such that an event associated with text matching (i) the regular expression and (ii) at least one hash value from either the first set of one or more hash values or the second set of one or more hash values can be identified as requiring monitoring.

25. A method for identifying an event requiring monitoring, the method comprising:
receiving at a first computer and from a second computer a package corresponding to a keyword, wherein the second computer is not accessible by a user of the first computer, the package comprising a regular expression that is satisfied by at least a portion of the keyword, an identifier corresponding to the keyword and at least one hash value generated from at least a portion of the keyword;
identifying a set of text at the first computer, the set of text being associated with an event;

evaluating the set of text against the regular expression to determine whether at least a portion of the set of text satisfies the regular expression;

generating a text hash from the at least a portion of the set of text;

comparing the text hash to the at least one hash value; and based on a comparison of the text hash with the at least one hash value, identifying the event as an event requiring monitoring.

26. The method recited in claim 25, wherein the at least one hash value is a plurality of hash values comprising a first hash value and a second hash value, and wherein comparing the text hash with the at least one hash value comprises:

comparing the text hash with the first hash value; and if the text hash matches the first hash value:

generating a second text hash from the at least a portion of the set of text; and comparing the second text hash with the second hash value.

27. The method recited in claim 26, wherein the first hash value is a high speed hash value and wherein the second hash value is a low-speed hash value.

28. The method recited in claim 26, wherein the first hash value corresponds to a plurality of words including the keyword, and wherein the second hash value corresponds only to the keyword.

29. The method recited in claim 25, wherein the regular expression is satisfied by a stem of the keyword.

30. The method recited in claim 29, wherein:

the stem of the keyword comprises a portion of the keyword and at least one wildcard character;

the regular expression is constructed using the portion of the keyword and a set of filler material that is substituted for the wildcard character; and the at least one hash value is generated from the portion of the keyword and the wildcard character.

31. The method recited in claim 30, the regular expression is obfuscated, such that it is difficult to ascertain from the regular expression a set of keywords that satisfy the regular expression.

32. A computer program embodied in a non-transitory computer readable medium for identifying an event requiring monitoring, the computer program comprising set of instructions executable by a first computer not accessible by a user of a second computer, the set of instructions comprising:

instructions to receive from the second computer a package corresponding to a keyword, the package comprising a regular expression that is satisfied by the keyword, an identifier corresponding to the keyword and at least one hash value generated from the keyword;

instructions to identify a set of text, the set of text being associated with an event;

instructions to evaluate the set of text against the regular expression to determine whether at least a portion of the set of text satisfies the regular expression;

instructions to generate a text hash from the at least a portion of the set of text;

instructions to compare the text hash to the at least one hash value;

instructions to identify the event as an event requiring monitoring, based on a comparison of the text hash with the at least one hash value.

33. The computer program recited in claim 32, wherein the computer program is designed to be uploaded to the first computer without the knowledge of a user of the first computer.

34. The computer program recited in claim 32, wherein the computer program is designed to execute the set of instructions without providing to a user of the first computer any information about the set of text being monitored.

35. The computer program recited in claim 32, wherein the computer program is designed to execute the set of instructions without the knowledge of a user of the first computer.

* * * * *

UNITED STATES PATENT AND TRADEMARK OFFICE
CERTIFICATE OF CORRECTION

PATENT NO. : 8,141,149 B1
APPLICATION NO. : 11/557007
DATED : March 20, 2012
INVENTOR(S) : Brent E. Henry et al.

It is certified that error appears in the above-identified patent and that said Letters Patent is hereby corrected as shown below:

On Sheet 2 of 6, Reference Numeral 210, Figure 2, line 2, delete "EXPRESSIONS(S)" and insert -- EXPRESSION(S) --, therefor.

In column 3, line 46, delete "keyword." and insert -- keyword --, therefor.

In column 6, line 38, delete "corresponding" and insert -- corresponding to --, therefor.

In column 8, line 29, delete "keyword." and insert -- keyword --, therefor.

In column 9, line 53, delete "to is" and insert -- is --, therefor.

In column 12, line 24, delete "already" and insert -- 11/556,968, 11/557,025 and 11/557,047, already --, therefor.

In column 16, line 20, delete "the a" and insert -- a --, therefor.

In column 18, line 57, in Claim 2, delete "by" and insert -- by claim --, therefor.

In column 19, line 6, in Claim 6, delete "of" and insert -- of: --, therefor.

In column 19, lines 56-64, in Claim 15, delete "15. The method recited in claim 14, wherein:
generating an identifier comprises generating a plurality of identifiers, each of the plurality of
    identifiers corresponding to one of the plurality of keywords; and
generating a set of one or more hash values comprises generating a plurality of sets of **one
    or more** hash values, each of the plurality of sets of one or more hash values corresponding
to one of the plurality of keywords."

Signed and Sealed this
Seventh Day of August, 2012

David J. Kappos
*Director of the United States Patent and Trademark Office*

CERTIFICATE OF CORRECTION (continued)
U.S. Pat. No. 8,141,149 B1 and insert -- 15. The method recited in claim 14, wherein:

generating an identifier comprises generating a plurality of identifiers, each of the plurality of identifiers corresponding to one of the plurality of keywords; and generating a set of one or more hash values comprises generating a plurality of sets of one or more hash values, each of the plurality of sets of one or more hash values corresponding to one of the plurality of keywords. --, therefor.

In column 22, line 7, in Claim 32, delete "set" and insert -- a set --, therefor.